Jan. 13, 1959     J. E. VISTAIN, JR     2,868,545
PHONOGRAPH RECORD PLAYER CONTROL
Filed Dec. 3, 1952     6 Sheets-Sheet 1

INVENTOR.
James E. Vistain Jr.

Fig. 3.

Jan. 13, 1959 J. E. VISTAIN, JR 2,868,545
PHONOGRAPH RECORD PLAYER CONTROL
Filed Dec. 3, 1952 6 Sheets-Sheet 5

INVENTOR.
James E. Vistain Jr.
BY
J. N. Douglas
His Atty.

Jan. 13, 1959 J. E. VISTAIN, JR 2,868,545
PHONOGRAPH RECORD PLAYER CONTROL
Filed Dec. 3, 1952 6 Sheets-Sheet 6

INVENTOR.
James E. Vistain Jr.
BY
his Atty.

United States Patent Office 2,868,545
Patented Jan. 13, 1959

2,868,545

PHONOGRAPH RECORD PLAYER CONTROL

James E. Vistain, Jr., Skokie, Ill., assignor to Admiral Corporation, Chicago, Ill., a corporation of Delaware Application December 3, 1952, Serial No. 323,863

3 Claims. (Cl. 274—10)

This invention relates to controls of the class employed in conjunction with automatic record changers and particularly to apparatus for stopping the operation of the turntable when the last record of a group, magazined in the apparatus has been reproduced.

Among the improvements incorporated in the present invention are those which provide for ease in operation of the mechanism, convenience of repair or adjustment and economy in manufacture.

Other advantages of the invention will be set forth in part hereinafter and in part will be obvious herefrom, or may be learned by practice with the invention, the same being realized and attained by means of the instrumentalities and combinations pointed out in the appended claims.

Figure 1:
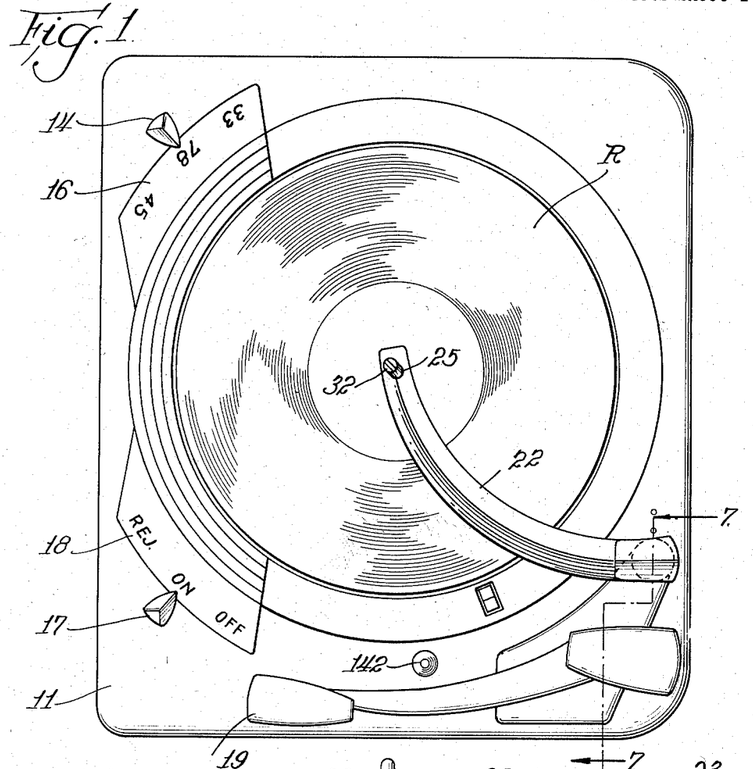
Fig. 1 is a top plan view of an automatic record player in which the invention is incorporated.

The invention described herein is applicable to the apparatus forming the subject matter of my copending application, Ser. No. 255,344, filed November 8, 1951. Consequently, the older apparatus will be indicated in less detail than the novel mechanism in combination therewith. In keeping with this, it should be noted that the mechanism shown in Fig. 1 includes a base plate 11 providing a stationary support from which other parts of the record player are directly or indirectly supported. The other parts include a spindle 12, turntable 13 and means for varying the speed thereof including a lever 14 movable over an indicator plate 16. There is also a lever 17, movable over a dial 18 to turn the record player on and off, besides rejecting a record. In addition, a pickup arm 19 is appropriately supported for rocking about a horizontal axis and swinging motion about a vertical axis. One or more records R are supported on a shoulder 21 of the spindle 12. The uppermost of the group is engaged by a keeper arm 22. The keeper arm is carried by a vertical shaft 24, from the upper end thereof and a compression spring 26 surrounds the shaft and is engaged between a flange or washer 27, fixed to the lower end of the shaft, and a bushing 28 within which the shaft is slidably journaled. The bushing 28 is fixed in a support column 29 that is an integral part of a bearer member 31 and which member also provides support for the pickup arm 19. The keeper arm 22 has a aperture 25 (Fig. 1) through the one end through which a guide or pilot portion 32 of the spindle 12 may pass freely. The shaft 24 (Fig. 7) is also rotatable in bushing 25 so that for loading the pilot portion with a stack of records by threading their center holes thereover, the arm 22 may be lifted against the force of spring 26, swung laterally until the records can be placed on the shoulder 21 and the arm then swung back and allowed to be drawn down against the top record of the stack, the pilot of the spindle then extends through the aperture 25. The records are successively released from the support of the shoulder 21, by mechanism not shown, as a record on the turntable is reproduced or rejected. When the supply of records, supported by the spindle, have all been released to the turntable the arm 22 is drawn, partly by gravity and partly by the spring 26, to a level slightly below the level of spindle shoulder 21. Concurrently with this, the lower extremity of shaft 24 is moved from its position indicated in Fig. 7 to the position shown in Fig. 8.

The turntable 13 has a depending flange 38 which is engaged by an idler 39 floatingly supported for driving engagement therewith and with the shaft so that the turntable may be operated at a speed of 78 R. P. M. Belt-connected to the shaft 37 is a pair of compound idlers 41 supported by a system of levers 43, movable by the pointer 14. When the pointer 14 is moved to one extreme position from its Fig. 1 position, one of the idlers 41 drivingly engages the idler 39 and moves it out of engagement with the shaft 37 which is driven by the motor 36. When the lever 14 is moved in the opposite direction, from the position indicated, the other of the idlers 41 drivingly engages idler 39, and moves it out of engagement with shaft 37. Thus turntable speeds of 33⅓ R. P. M. and 45 R. P. M. are derived since the idlers differ in diameter from each other.

Current to the motor 36 is controlled by a switch 44 (Fig. 4) having an operating arm 46. The switch 44 is fixed to the base 11 and is of the snap type; that is, its operating arm 46 when moved slightly in either direction beyond a midway position immediately snaps by spring pressure to the nearest extreme position of "open" or "closed" circuit. The switch may be manually operated to start and stop the motor 36 by moving the lever 17, which is at one end of a lever 47 pivoted to the frame at 45 while at the opposite end thereof a pin 48 engages in the forked end of the arm 46 and moves the latter to either of its positions.

Figure 3:
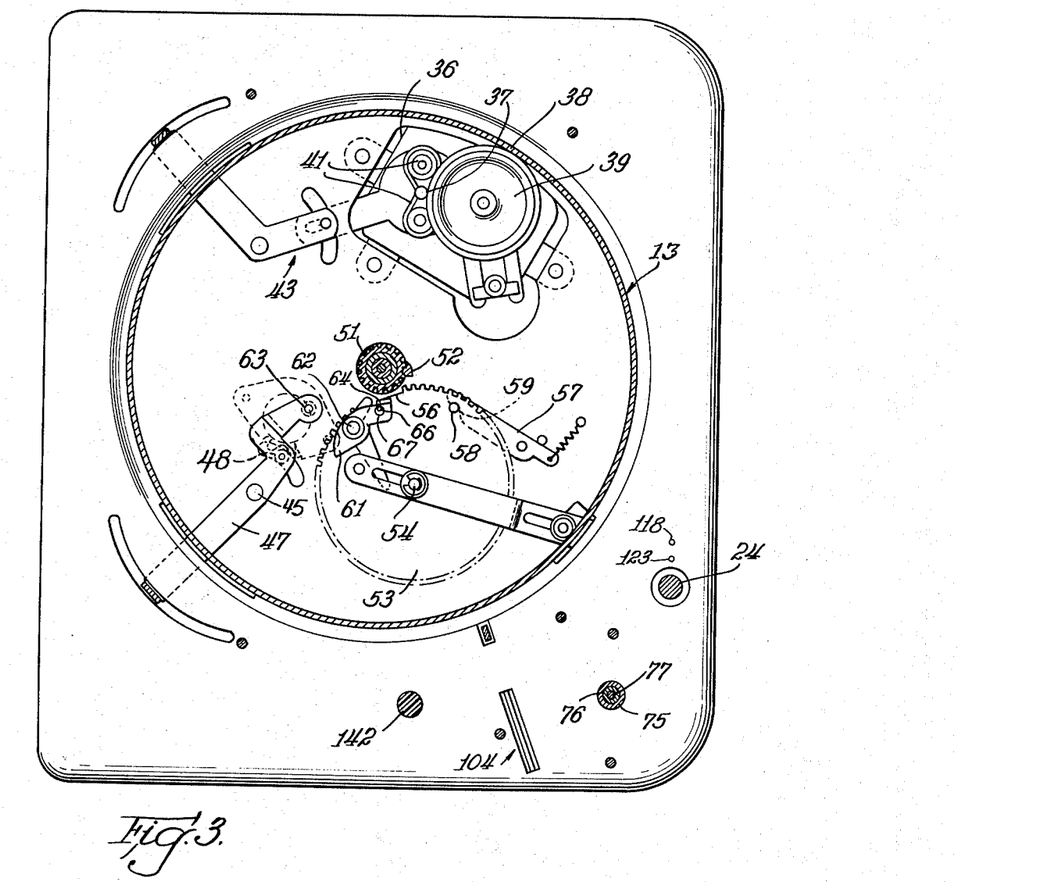
Fig. 3 is a section taken on line 3—3 of Fig. 2.

The lever 47 may also initiate operation of a record changing cycle. The means by which this is brought about includes a pinion 51 (Fig. 3), at the axis of the turntable which rotates therewith along with a striker lug 52 beside the pinion. A vertical shaft 54, rotatably supported from the base 11 carries on the upper end a mutilated gear 53 for cooperation with the pinion 51. During reproduction of a record, a blank space 56, in the series of teeth of gear 53, is opposite the pinion 51 so that the gear is motionless. The gear is held in this position by a spring-biased lever 57, having a notch 59 that engages a pin 58 in the gear. When the gear is moved by the striker lug 52, the teeth of the pinion and gear mesh and the gear is rotated until the blank space 56 again moves opposite the pinion, and the gear is then held by the lever 57, a cycle of motion having been completed.

The gear 53 is moved initially by a dog or lever 61 pivotally supported at 62 from the gear 53 and which is adapted to be engaged by a pin 63 carried by the lever 47. As the handle 17 is moved to "Rej" position (Fig. 1), the pin 63 engages the dog 61 and swings it clockwise about its pivot 62 and carries a lug 64 on the end of said dog into the path of the striker 52. The consequent push imparted to the gear from the striker through dog 61 causes the pinion 51 to mesh with the teeth of the gear 53. The motion of dog 61 is limited by a pin 66, on the gear, which passes loosely through an aperture 67, in the dog.

The gear 53 which is secured to the shaft 54 rotates a crank plate 69, fixed to the other end of shaft. The crank plate carries a crank pin 71 pivotally connected to cam link 73. The other end of the link is pivotally connected to a pin 72 on the swing-out mechanism. The swingout or oscillatory mechanism 68 is arranged for oscillatory motion about a post 74, on the base plate, as the crank plate is turned.

Figure 4:
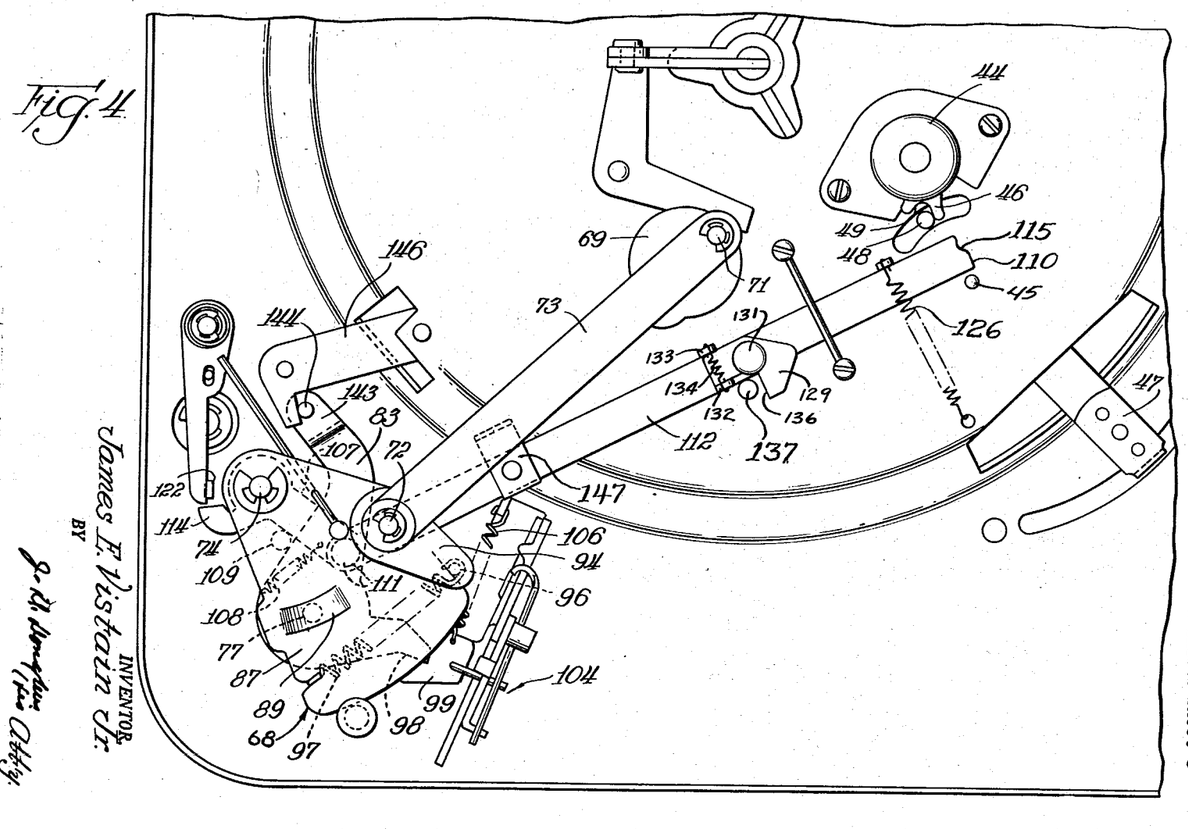
Fig. 4 is a fragmentary bottom plan view of the record player, drawn to an enlarged scale.

The pickup arm is attached to a tubular sleeve 76 rotatable in a set-down arm sleeve 75 which is supported by the bearer member 31. A lift pin 77 is journalled for axial motion within the pickup arm support sleeve. The sleeve 75 has a flange 78 on its lower end which is held in engagement with the base plate by a compression spring 79 confined between said base plate and a washer 81 on the sleeve. The lower end of the pickup arm sleeve 76 carries a pickup control arm 83. The arm 83 is supported in spaced relation to the lower end of the sleeve 75 by a collar 84 fixed to the upper end of sleeve 76 and bearing against a boss 86 forming an integral part of the bearer member 31. The swing-out mechanism also includes a cam plate 87 (Fig. 4) mounted for swinging motion about the post 74. The plate 87 has a vertically effective cam surface 89 thereon for cooperation with the lift pin 77 so that when the machine operates cyclically, the pin 77 rides upward on the cam 89 as the plate swings on the post 74 (Fig. 4). The upward motion of pin 77 is comunicated to the pickup arm 19 causing it to rock upward about a hinge pin 91 pivotally coupling a pair of yoke arms 93, on the collar 84 to a pair of arms 92 on the arm 19. At the end of a cycle, the lift pin 77 is restored to its position indicated (Fig. 7) by gravity, the lowest part of cam 89 moving under the pin to enable the pickup arm to rock downward.

In order to understand the means by which the pickup arm 19 is swung about its vertical axis it should be noted (Fig. 4) that the pin 72, which connects the link 73 to the plate 87, also affords a pivot for connecting a contractor arm 94 to the plate 87. The arm 94 carries a pin 96 which is held in engagement with the edge of plate 87 by a spring 97 the ends of which are anchored to the arm 94 and is a notch in the plate 87 as indicated. When the cam plate 87 swings, the pin 96 is moved clockwise about the post 74 with the cam until it engages the extension 98 of the pickup control arm 83 which is also swung clockwise to swing the pickup arm outward.

The pickup arm is swung inward by the pressure of the spring biased set-down arm 99 through clutch means. This can best be understood by reference to Figs. 4 and 7. The set-down arm 99 is depicted as fixed to the lower end of the sleeve 75. The lower side of arm 99 bears a friction washer 101 for engagement with but normally spaced from the control arm 83 during record playing. When the cam plate 87 starts its motion, the lift pin 77 is moved upward. In doing so, pin 77 moves a compression spring 102, coiled thereabout and confined between a flange 103 on said pin and the pickup control arm 83 to lift said arm into frictional engagement with the set-down arm, along with consequent upward movement of the pickup arm. Following this operation, the set-down arm 99 is engaged by the pin 96 for outward movement of the arm to a predetermined position wherein it will be in readiness for cooperation with a selector mechanism indicated in its entirety by the character 104 for determining the point at which the pickup arm is lowered into engagement with a record during its inward movement. The selector mechanism 104 will not be described, however, since it is not material to an understanding of the present invention and is described in detail in the application aforesaid. The movement of set-down arms 99, clockwise (Fig. 4) is against the resistance of a spring 106 anchored to the arm so that after the crank pin 71 passes dead center, the spring 106 moves the control and pickup arm inward until the clutch operation between the set-down arm and control arm is made ineffective at the end of a cycle.

The setting of the invention having been indicated, the novel features in combination therewith will now be described. Briefly, they involve a linkage, coupled to the swing-out mechanism 68, for communicating motion to the switch for opening it after the last magazined record has been played, this mechanism being ineffective so long as a record is in the magazine but is rendered effective when the last record is discharged and the keeper arm lowered. The linkage includes a lever 107 (Fig. 5), pivotally supported by the post 74 above and in adjacent relationship to the cam plate 87. The linkage 107 is biased into engagement with a pin 109 on the plate 87 by a spring 108. A transmission link 112 pivotally connects at 111 to the lever 107, and is arranged to be oscillated longitudinally thereby as the lever 107 is swung forward and backward in the course of a cycle of motion of the cam. During its operation, the link 112 is supported for limited lateral movement within limits by a cleat 113. The cleat 113 which has end portions that are offset and fixed to the base plate 11, the intermediate portion providing for lateral motion of the link freely between said base plate and cleat. The free end 110 of the link, as long as a record is in the magazine, moves in a course to one side of the switch operating pin 48. This is effected by a spring 126 (Fig. 4) anchored to the link to bias it away from the pin 48. For eventual and effective engagement with the pin 48, the end 110 may be notched slightly at 115.

By the relationship between the lever 107, pin 109 and spring 108, it will now be understood that when the pickup arm is swung outward the link 112 is yieldably drawn through its forward stroke, owing to the spring 108 which is preloaded by its relationship to the cam plate 87 and lever 107. It will also be apparent that the link 112 is positively driven during its backward motion owning to the relationship between the stud 109 and lever 107. Advantage is therefore taken of the yieldable manner in which the linkage is moved to vary its stroke by interposing in its course suitable stop arranged to limit the operation of the transmission link to a short stroke when opening of the switch is untimely.

Figures 5, 6:
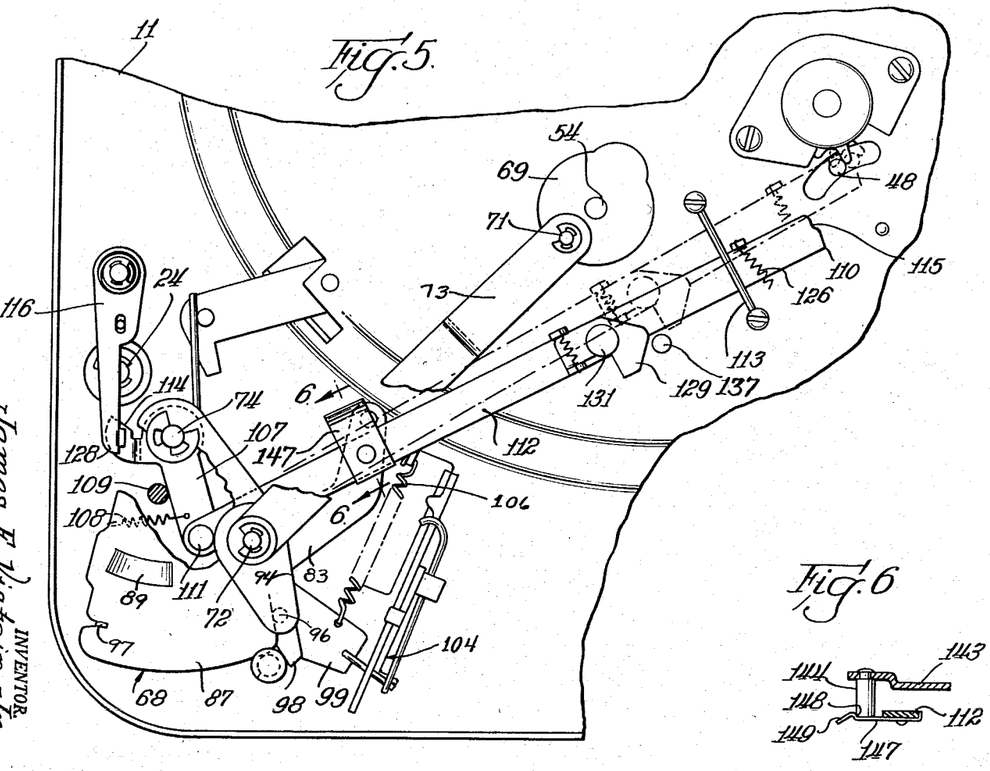
Fig. 5 is a view corresponding to Fig. 4 showing parts in a different position.
Fig. 6 is a section indicated by line 6—6 of Fig. 5.
Figure 7:
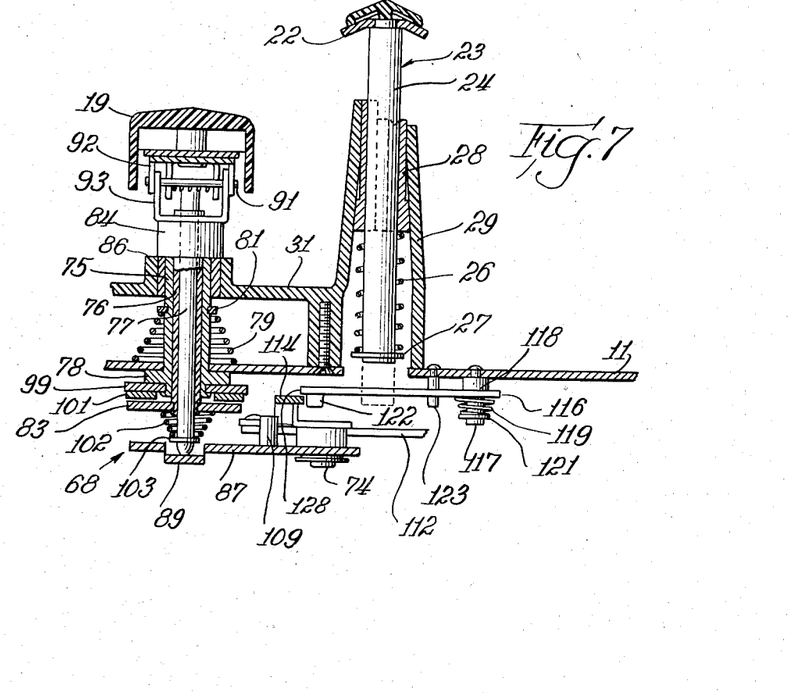
Fig. 7 is a vertical section taken on line 7—7 of Fig. 1.
Figure 8:
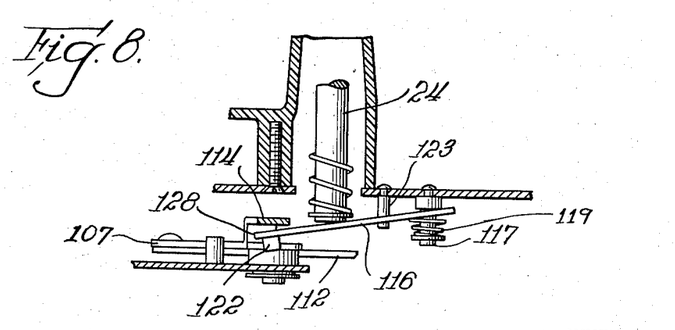
Fig. 8 is also a section corresponding to Fig. 7, some of the parts having been broken away and others shown in a different position.

One form of mechanism by which the stroke of the link 112 may vary is best shown in Figs. 5 and 7 and includes stop lever 116, floatingly supported on a post 117 extending downward from the base plate 11. The post 117 passes freely through one end of said lever which is biased into engagement with a shoulder 118 on the post by a compression spring 119 coiled about said post and confined between said lever and a head for the post provided by a pinch washer 121. To resist rotation of the lever 116 about its support, a guide pin 123 is provided on the base plate, which also extends freely through said lever. The lever 116 has a lug 122 which is bent downward from one of its sides, adjacent its free end. The lever 107, on the other hand, has an offset portion or striker 114 on its free end for engagement with the lug 122 when lever 116 is in its uppermost position (Fig. 7). This is the position the stop carrier occupies so long as there is a record on the spindle shoulder 21. From this position the lever 116 is rocked downward to the position it ocupies in Fig. 8 against the force of spring 119 by the shaft 24, when the last record has been released from the spindle shoulder 21 and the keeper shaft 24 moves downward.

It will now be apparent that while the cam plate 87 is arranged to swing uninterrupted through its entire course, the motion of the lever 107 and link 112 may be interrupted by engagement of the lug 122 with the striker. This engagement always takes place whenever the keeper shaft 24 is in its upermost position resulting in a short stroke for the link 112 which is to move the pin 48 and open the switch.

When the last record borne by the spindle shoulder 21 is released therefrom, it takes place at a point during the cyclic motion of the swing-out mechanism when the lever 107 has been carried to nearly engage with the lug 122 of stop lever 116, or may even engage said lug but with normally insufficient pressure to resist its downward movement by the keeper shaft 24. The downward motion of the stop lever 116 is limited, however, by a lip 128 on the lever 116 that extends beyond the lug 122. Owing to this construction, the lip 128 rests on the top of the contactor 114 while the lug 122 engaging the edge of the contactor prevents movement of the link 112 to a greater degree than has already been described for playing of a record prior to release of the last record from the spindle shoulder 21. This cooperation between the lip 128 and lug 122 with the contactor 114 enables the last record, of a stack released to the turntable and to be played before the switch is opened, as will later be more apparent.

When the last of the records released from the shoulder 21 has been reproduced, the shaft 24, is of course, allowed to move toward its lowermost position (Fig. 8) and to move the stop lever 116 before it against the force of spring 119. In its lowermost position the lug 122 is out of the course that the striker is adapted to be carried through, hence during an ensuing cycle the positional relationship of lever 107 to the plate 87 does not change and the link 112 is therefore moved through a long stroke.

Figure 9:
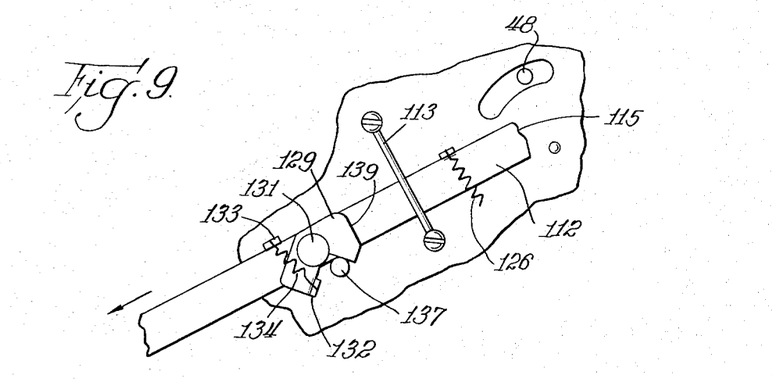
Figs. 9 and 10 are fragmentary views illustrating some of the mechanism shown in Fig. 5 parts of which are in additional positions.
Figure 10:
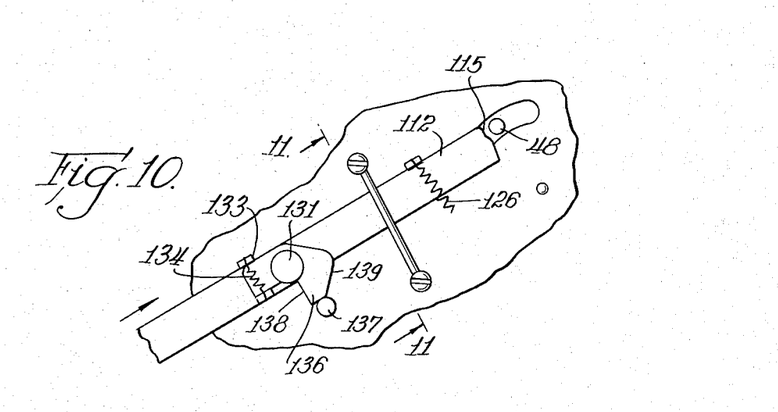
Figure 11:
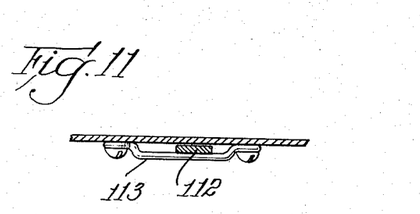
Fig. 11 is a section taken on line 11—11 of Fig. 10.

It is essential that the link 112 be deflected from its usual course when moved backward in order that said link may cooperate with the pin 48 for opening the switch. This is carried out by latch mechanism best shown in Figs. 4, 9 and 10. It comprises a lever 129 pivoted at 131 to the link 112. From one of its sides the member 129 has an ear 132 struck upward therefrom, while engaging its side opposite the ear 132 is an ear 133 struck upward from the link 112 into engagement with which the lever 129 is biased by a tension spring 134 anchored to the ears 132 and 133. An operating portion 136 of the lever 129 extends beyond the edge of the link 112 and is adapted to cooperate with a post 137 on the base plate 11. For so doing, the operating portion 136 has a contactor surface 138 which normally is substantially perpendicular to the edge of the link 112 for abutment with the post 137 when the link is moved forward through a long stroke (Fig. 9). During this motion of the link, the operating portion 136 is carried past the post 137 which turns the member 129 about its pivot 131 against the resistance of spring 134 (Fig. 9) until the portion 136 has passed the post 137, as it is depicted in Fig. 5. On passing the post 137, the spring 134 snaps the member 129 back to its normal position. Sequentially, during the second half of the cycle a cam 139 (Fig. 10) on the edge of operating portion 136 engages the post 137. The cam is so formed that cooperation thereof with the post causes the link 112 to be moved laterally away from said post, since the ear 133 engaging lever 129, prevents said lever from rotating clockwise. At approximately the point when the tip of the portion 136 is passing post 137 (Fig. 10) the free end of link 112 at the notch 115 engages the pin 48 after which additional motion of the link opens the switch by cooperation between the notch 115 and pin 48 resulting in a complete shut-down in operation of the record player.

Although the switch has been described as having been opened by the link 112 through the instrumentality of the post 137, the other means for communicating motion of the lever 107 to the switch are contemplated. For example, a cam on the base plate may be arranged to deflect the link away from its course while it is moved backward without deflecting it from its course forward. Also, engagement of the switch arm 46 by the link 112 to open the switch is also contemplated.

Figure 2:
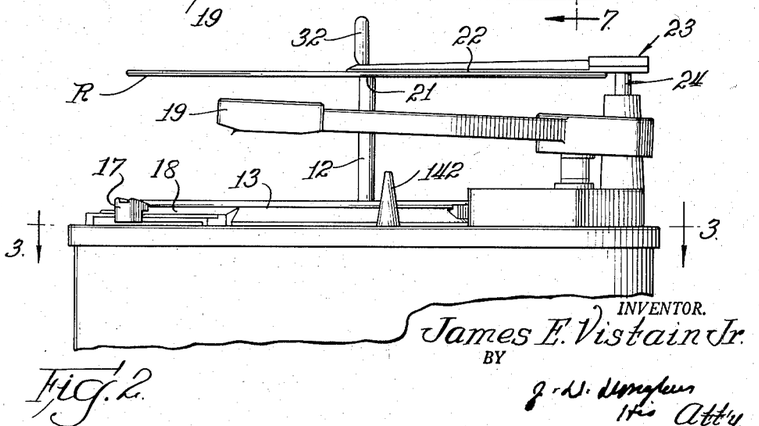
Fig. 2 is a view of the same, in side elevation.

Provision is made for lowering the pickup arm 19 into engagement with a support post 142, (Fig. 2) beside the turntable, just before the switch is automatically opened. To understand how this is accomplished, it should be noted that the pickup arm control member 83 has an arm portion 143 (Fig. 4) from the end of which a stud 144 extends. Although the stud 144 was primarily intended, as indicated in the application aforesaid, to move a slider link 146 which automatically initiates driving engagement between the pinion 51 and gear 53, advantage is taken of the concurrent movement of the pickup arm inward from its outermost position until the pickup arm starts its downward rocking motion after which there is no further force exerted on said arm to urge it in an inward direction. This is carried into effect as follows: A leaf spring 147 is fixed to the link 112 and terminates in a free end portion extending from the side of the link 112 (Fig. 6). The spring leaf 147 is formed to provide a cam surface 149 extending from its free end and through which the tip of the stud 144 is carried during a cycle. Remote from its free end, the cam 149 terminates in a hook 148. The spring 147 is so positioned on the link 112 that when the cyclic movement of said link is restricted to a short course, as indicated, the course through which the spring is carried falls short of the course through which the stud 144 is carried.

When, however, a last record from the spindle has been played and the link 112 moves cyclically through a long stroke, the stud 144 is carried into engagement with the cam 149, as the pickup arm 19 approaches the limit of its outward movement. Then the ensuing cooperation between stud 144 and cam 149 deflects the spring 147 downward adequately to enable the hook portion 148 to snap upward over the tip of the stud 144 at the same time the pickup arm reaches the outermost point of its travel. Although the hook 148 is eventually disengaged from the stud 144 by its being carried laterally with the link 112, disengagement in this manner does not occur until the set-down arm 99 is declutched from the pickup arm control member 83 toward the end of a cycle. Prior to the declutching operation, while the stud 144 is held by the hook 148, there is slippage between the clutch pickup arm control 83 and friction washer 101 to enable the set-down arm 99 to continue its inward movement independently of the pickup arm control member. As the tone arm 19 is lowered at its outermost position, immediately before a cycle is completed, it comes to rest on the support post 142. While resting thereon, the post 142 prevents the pickup arm from swaying aimlessly thereby preserving the needle of the transducer and providing freedom for an attendant to remove played records from the turntable or to reload the spindle with unplayed records.

It will be appreciated that the switch operating pin 48 on the lever 47 could be mounted on the switch arm 46 in event that it was not desired to shut off the changer manually.

To start the record player, when the pickup arm 19 is resting on the post 142, an attendant moves the pointer 17 from its position adjacent "Off" to a position beside the indicia "Rej." This besides closing the switch 44, initiates a record changing cycle during which the tone arm is lifted from the post 142 and moved over the beginning of a record, on the turntable, and into engagement with which said tone arm is lowered at the end of the cycle.

While I have shown my invention in an embodiment

I claim:

1. An automatic record player apparatus including a manually operated striker movable through a course for opening and closing a motor snap switch for activating the apparatus and a cam plate swingable through a cycle from which motion is communicated to a center post ejector for effecting release from a magazine of the lowermost of a stack of records supported thereby and keeper means engaging the top record of the stack by which the means is held in an upper position from which it is arranged to move to a lower position when the last record has been released, in combination, a linkage including a transmission link in association with the striker and movable longitudinally thereof in the course of a cycle of the cam plate, means coupled to the link for biasing said link laterally for independent operation of said link and striker spring means connecting the linkage to the cam plate, said spring being under deflection to provide yieldable driving of the link in one direction and said link being engaged by the cam plate for positive driving in the opposite direction during a cycle, a pair of mobile stops in fixed association with each other, said stops being biased into engagement with the keeper for displacement thereby out of the course of the linkage when said keeper moves to its lowermost position to provide freedom for motion of the link through a long stroke during a cycle, the stop moving into the course of the linkage for engagement therewith and consequent restriction of the linkage to a short stroke by additional deflection of the spring when the linkage is yieldably driven and the keeper is in its uppermost position, latch mechanism to deflect the course of the link for its cooperation with the striker when said link is operated through a long stroke comprising a fixed latch element, and a pivoted latch element, one of the elements being carried by the link, the pivoted element being biased to a predetermined position for engagement by the other element and being moved away from its predetermined position by said other element when the link is yieldably driven but arranged to cooperate with the said element to deflect its course and thereby deflect the course of said link so that said link at the end of a cycle may engage the striker and move it to open the switch when said link is positively driven, a short stroke of the link being ineffective to provide for cooperation between the elements to deflect the course of said link, the other of said stops engaging the linkage when the keeper is released from its uppermost position to concurrently restrict said keeper from moving to its lowermost position and to retain said one stop in engagement with the linkage to restrict the operation of the link to a short stroke until after the last released record has been played.

2. An automatic record player apparatus including a manually operated striker movable through a course for opening and closing a snap switch in circuit with a motor for activating the apparatus which also includes a cam plate swingable through a cycle from which motion is communicated to a center post ejector for effecting release from a magazine of the lowermost of a stack of records supported thereby and a keeper mechanism engaging the top record of the stack by which the mechanism is held in an uppermost position and from which it is arranged to move to a lower position when the last magazined record has been released, in combination, a linkage including a transmission link in association with the striker and movable longitudinally in the course of a cycle of the cam plate, means coupled to the link for biasing said link laterally for independent operation of said link and said striker, a spring coupling the linkage to the cam plate, said spring by its connection being under deflection to provide a yieldable driving connection for the link in one direction and means engaging the link for positive driving of said link in the opposite direction during a cycle, a pivoted arm arranged for engagement by the keeper, a pair of stops carried by the arm, the arm being arranged for displacement by the keeper to carry the stops out of the course of the linkage when said keeper is moved to a lower position to provide freedom for motion of the link through a long stroke during a cycle, one stop moving into the course of the linkage for engagement therewith and consequent restriction of the link to a short stroke by additional deflection of the spring when the linkage is yieldably driven and when the keeper is in its upper position, latch mechanism to deflect the course of the link for its cooperation with the striker when said link is operated through a long stroke comprising a fixed latch element, a pivoted latch element, one of the elements being carried by the link, one of the elements also having a cam surface and an abutment surface thereon, the pivoted element being biased to a predetermined position with respect to the link and arranged for engagement of the abutment surface by the other element whereby said pivoted element is moved away from its predetermined position to permit movement of the link to the end of a long stroke when it is moved during the forward part of its cyclic motion, the cam surface engaging the other element to move the one element bodily for displacement of the link laterally during its return stroke of a cycle so that said link is thereby arranged to travel after its displacement into engagement with the striker for moving it to open the switch at the end of a cycle when said link is positively driven, a short stroke of the link being ineffective for cooperation between the elements to deflect the course of said link, the other of said stops engaging the linkage when the keeper is released from its uppermost position to concurrently restrict said keeper from moving to its lowermost position and to retain said one stop in engagement with the linkage to restrict the operation of the link to a short stroke until after the last released record has been played.

3. Automatic record player apparatus including a manually operated striker movable through a course for opening a snap switch in circuit with a motor for activating the apparatus which also includes a cam plate arranged to oscillate about a vertical axis through a cycle from which motion is communicated to an ejector for effecting release therefrom of the lowermost of a stack of records supported by a magazine and thereon operatively retained by keeper mechanism engaging the top record of the stack by which the mechanism is held in an uppermost position when the last magazined record has been released, in combination, linkage comprising a lever associated with the plate to swing about the axis thereof, a spring coupled to the plate and lever and being under deflection by biasing said lever into a predetermined relationship to the plate that the lever may be positively driven in one direction and yieldably driven in the opposite direction when the plate is oscillated through a cycle, a transmission link in association with the striker and coupled to the lever, means coupled to the link for biasing said link laterally for operation of said link and/or said striker independently of each other, a fixed guard limiting the movement of the link laterally within predetermined limits, a pivoted arm biased into association with the keeper, a pair of stops carried by the arm, the arm being arranged for displacement by the keeper to carry the stops out of the course of the linkage when said keeper is moved to its lowermost position to provide freedom for motion of the link through a long stroke during a cycle, one stop moving into the course of the lever for engagement therewith and consequent restriction of the link to a short stroke by additional deflection of the spring when the lever is yieldably driven and when the keeper is in its uppermost position, latch mechanism by which the link is arranged to operate the striker when said link is operated through a long stroke comprising a fixed latch element, and a pivoted latch element, one of the elements being carried by the link, said one element also having cam and abutment surfaces thereon, the pivoted element being biased to a predetermined position with respect to the link and arranged for engagement of the abutment surface by the other element whereby said pivoted element is moved away from its predetermined position to permit movement of the link to the end of a long stroke when it is moved during the forward part of its cyclic motion, the cam surface engaging the other element for displacement of the link laterally to move the one element bodily during its return stroke of a cycle, so that said link is thereby displaced laterally for engagement with the striker during its return motion for moving said striker to open the switch at the end of a stroke of said link when it is positively driven, a short stroke of the link being ineffective for cooperation between the elements to deflect the course of said link, the other of said stops engaging the linkage when the keeper is released from its uppermost position to concurrently restrict said keeper from moving to its lowermost position and to retain said one stop in engagement with the linkage to restrict the operation of the link to a short stroke until after the last released record has been played.

References Cited in the file of this patent

UNITED STATES PATENTS

| | | |
|---|---|---|
| 2,270,995 | Compare | Jan. 27, 1942 |
| 2,295,092 | Offen | Sept. 8, 1942 |
| 2,545,643 | Bender | Mar. 20, 1951 |
| 2,597,803 | Kenney et al. | May 20, 1952 |
| 2,601,986 | James et al. | July 1, 1952 |
| 2,614,847 | Johnson | Oct. 21, 1952 |
| 2,616,705 | Leonard | Nov. 4, 1952 |
| 2,640,702 | Haggerty | June 2, 1953 |
| 2,652,258 | Dale et al. | Sept. 15, 1953 |

FOREIGN PATENTS

| | | |
|---|---|---|
| 451,846 | Great Britain | Aug. 4, 1936 |
| 664,630 | Great Britain | Jan. 9, 1952 |